(12) United States Patent
Mongin et al.

(10) Patent No.: US 7,147,165 B2
(45) Date of Patent: *Dec. 12, 2006

(54) ADAPTING ELEMENT FOR PROGRAMMABLE ELECTRONIC HOLDERS

(75) Inventors: Hervé Mongin, Trainou (FR); Frédéric Beulet, Meung sur Loire (FR); Benoît Berthe, La Chapelle St Mesmin (FR)

(73) Assignee: Datacard Corporation, Minnetonka, MN (US)

( * ) Notice: Subject to any disclaimer, the term of this patent is extended or adjusted under 35 U.S.C. 154(b) by 193 days.

This patent is subject to a terminal disclaimer.

(21) Appl. No.: 10/747,246

(22) Filed: Dec. 30, 2003

(65) Prior Publication Data

US 2005/0103870 A1    May 19, 2005

(30) Foreign Application Priority Data

Nov. 17, 2003   (FR)   ................................. 03 13425

(51) Int. Cl.
*G06K 7/00* (2006.01)
*G06K 5/00* (2006.01)
*G06K 13/00* (2006.01)

(52) U.S. Cl. .................. 235/486; 235/380; 235/475
(58) Field of Classification Search ................ 235/486, 235/475; 361/737
See application file for complete search history.

(56) References Cited

U.S. PATENT DOCUMENTS

| | | | | |
|---|---|---|---|---|
| 4,827,425 A | * | 5/1989 | Linden | 235/380 |
| 4,866,259 A | * | 9/1989 | Bonnemoy | 235/475 |
| 5,378,884 A | * | 1/1995 | Lundstrom et al. | 235/441 |
| 5,526,233 A | * | 6/1996 | Hayakawa | 361/737 |
| 5,799,316 A | * | 8/1998 | Audren | 235/375 |
| 5,920,055 A | * | 7/1999 | Roth et al. | 235/380 |
| 5,943,238 A | * | 8/1999 | Nioche et al. | 235/475 |
| 6,089,459 A | | 7/2000 | Eisele et al. | |
| 6,193,163 B1 | * | 2/2001 | Fehrman et al. | 235/441 |
| 6,283,368 B1 | | 9/2001 | Ormerod et al. | |
| 6,454,164 B1 | * | 9/2002 | Wakabayashi et al. | 235/380 |
| 6,457,647 B1 | * | 10/2002 | Kurihashi et al. | 235/486 |
| 6,484,935 B1 | * | 11/2002 | Fischbacher | 235/376 |
| 6,554,193 B1 | * | 4/2003 | Fehrman et al. | 235/488 |
| 6,695,205 B1 | * | 2/2004 | Lundstrom et al. | 235/380 |
| 6,761,313 B1 | * | 7/2004 | Hsieh et al. | 235/451 |
| 6,768,645 B1 | * | 7/2004 | Kadonaga | 361/737 |
| 6,827,264 B1 | * | 12/2004 | Morgavi | 235/451 |
| 2002/0081180 A1 | | 6/2002 | Berndtsson | |
| 2004/0060984 A1 | * | 4/2004 | Connelly et al. | 235/441 |
| 2004/0070952 A1 | * | 4/2004 | Higuchi et al. | 361/737 |
| 2005/0034889 A1 | * | 2/2005 | Mongin et al. | 174/52.4 |
| 2005/0231921 A1 | * | 10/2005 | Noda et al. | 361/737 |

FOREIGN PATENT DOCUMENTS

| | | |
|---|---|---|
| DE | 196 41 892 | 4/1998 |
| WO | WO 02/069285 | 9/2002 |

* cited by examiner

*Primary Examiner*—Jared J. Fureman
(74) *Attorney, Agent, or Firm*—Lowe, Hauptman & Berner

(57) ABSTRACT

The present invention concerns an adapting element (1) for at least one programmable electronic holder (2) to be personalized, having surface size larger than that of all programmable electronic holder to be personalized and meeting size accepted by the personalization machine, wherein the adapting element (1) is provided with a housing (101) of suitable size and shape to house and maintain at least one programmable electronic holder (2), so that contact or contactless communication means (203–204) of programmable electronic holder (2) are respectively positioned opposite or close to respective contact or contactless communication means of the personalization machine (3).

7 Claims, 3 Drawing Sheets

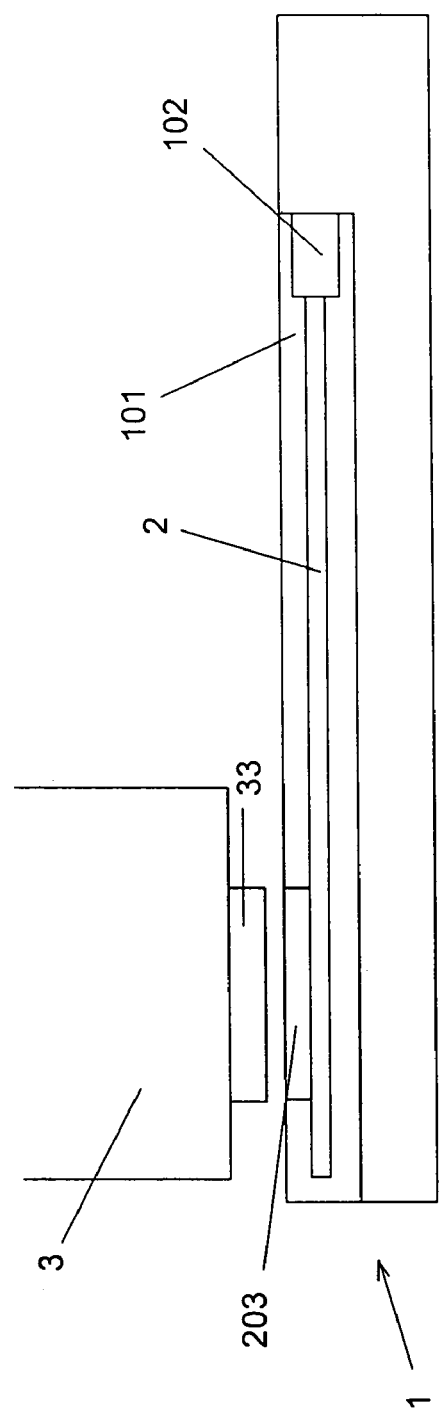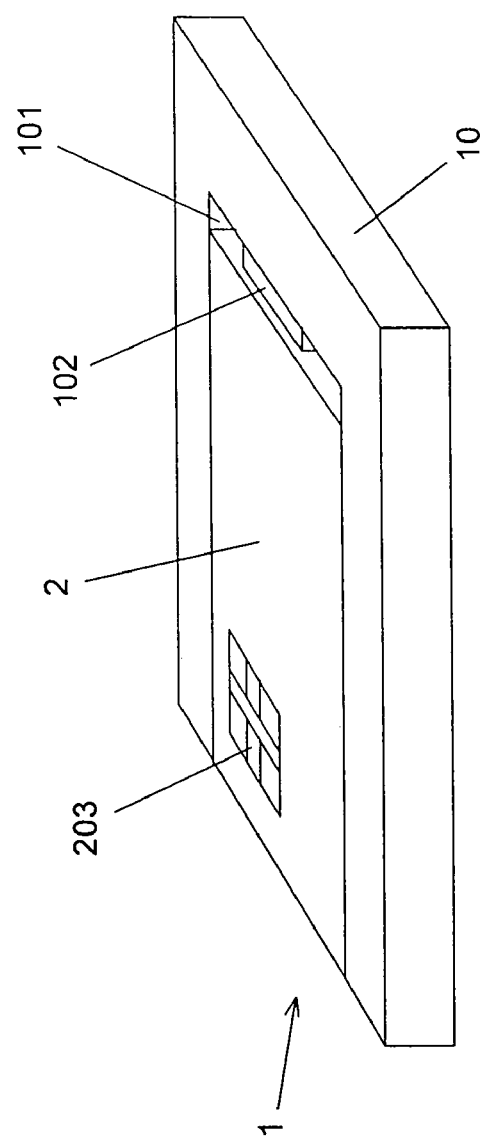

ADAPTING ELEMENT FOR PROGRAMMABLE ELECTRONIC HOLDERS

RELATED APPLICATIONS

The present application is based on, and claims priority to, French Application Serial Number 03 13425, filed Nov. 17, 2003, the disclosure of which is hereby incorporated by reference herein in its entirety.

FIELD OF THE INVENTION

The present invention concerns an adapting element for programmable electronic holders of varied types and forms, such as for example any item to be personalized having a contact zone of chip card type or an antenna and a circuit enabling communication, such as contactless keys, etc. each containing programmable memory and a logic sequencer or microprocessor, and the use of the adapting element in a multipurpose personalization machine for programmable electronic holders.

BACKGROUND ART

Personalization equipments know in the prior art are adapted to personalization of a single form or a single type of programmable electronic holder, necessitating heavy investment by manufacturers of different types of cards, who have to switch their equipment whenever the form or type of holder is modified.

SUMMARY OF THE INVENTION

The purpose of the present invention is to overcome some drawbacks of the prior art by proposing a means for using a single device to personalize all types of programmable electronic holders, which allows to reduce the investment costs and hence to reduce retail prices of the programmable electronic holders.

This purpose is achieved with an adapting element for at least one programmable electronic holder to be personalized, having a surface size larger than that of all programmable electronic holders to be personalized and meeting the size accepted by a personalization machine, the adapting element being characterized in that it is provided with a housing of adapted shape and size to house and maintain at least one programmable electronic holder so that contact or contactless communication means of the programmable electronic holder are respectively positioned opposite or close to respective contact or contactless communication means of the personalization machine.

According to a further feature, a plurality of identical adaptor elements of the invention are used in a multipurpose personalization machine for programmable electronic holders, the personalization machine comprising at least:
- an unstacking system to unstack adapting elements from an input hopper, and a stacking system to stack adapting elements in an output hopper, the input hopper and the output hopper possibly being separate or not,
- an insertion system for insert programmable electronic holders in adapting elements at the start of the personalization machine, and a removal system to remove the programmable electronic holders from the adapting elements at the end of the personalization machine,
- a driving system to drive the adapting elements provided with programmable electronic holders, to cause them to transit through a personalization machine, and
- a personalization device, comprising a communication system between a database supplying the personalization data and the programmable electronic holders via a contact or contactless link between the personalization device of the personalization machine and the communication means of the programmable electronic holder, to enable personalization of the programmable electronic holders by programming personalization data.

According to another feature, the personalization machine comprises a transferring system to transfer the adapting elements from the output hopper to the input hopper.

BRIEF DESCRIPTION OF THE DRAWINGS

Other features and advantages of the present invention will become more clearly apparent on reading the following description given with reference to the appended drawings in which:

FIG. 1a shows a longitudinal section view of the adapting element according to a first embodiment of the invention, a programmable electronic holder being in position inside the adapting element, FIG. 1b shows a perspective view of the adapting element according to the embodiment in FIG. 1a, FIG. 2 shows a longitudinal perspective view of the adapting element according to a second embodiment of the invention, a programmable electronic holder being in position in the adapting element.

DETAILED DESCRIPTION OF THE DRAWINGS

Figure 2:
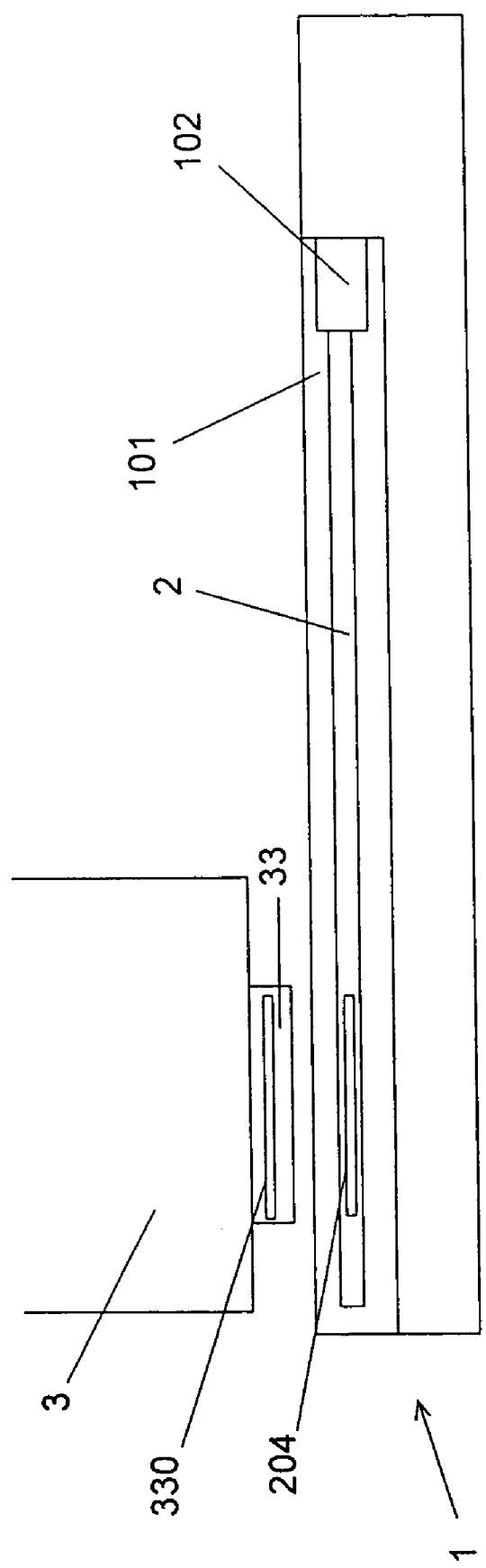

In a first embodiment shown in FIGS. 1a and 1b, the adapting element (1) according to the invention consists of a single unit 1 provided with a housing 101 of suitable shape and size to house one type of programmable electronic holder 2 comprising contact communication means such as a contact zone. At least one mechanical means 102 for holding the holder allows to maintain at least one programmable electronic holder 2 in housing 101. Housing 101 is arranged so that contact zone 203 of programmable electronic holder 2, inserted in said housing, is positioned opposite the contact pins of a personalization device 33 of a personalization machine 3. In this embodiment, personalization arrives from the personalization device 33 of the personalization machine 3 to contact zone 203 of the programmable electronic holder 2 via electric or optical link. Therefore the personalization machine 3 can dialogue directly with the programmable electronic holder.

In a second embodiment, shown in FIG. 2, the adapting element 1 of the invention consists of a single unit 1 provided with a housing 101 of suitable shape and size to house one type of programmable electronic holder 2 comprising contactless communication means such as a communication antenna 204 connected to an electronic signal processing card powering the programmable electronic holder 2 and enabling it to communicate via contactless link with a personalization device 33 of a personalization machine 3. At least one mechanical means 102 for holding the holder allows to maintain at least one programmable electronic holder 2 in housing 101. Housing 101 is arranged so that antenna 204 of programmable electronic holder 2, inserted in said housing, is positioned, whether aligned or not, close to a portion of the personalization device 33 of the personalization machine 3 comprising an antenna 330. In this embodiment, personalization data arrives from an antenna 330 of the personalization device 33 of the personalization machine 3 to the antenna 204 of the programmable electronic holder 2 via contactless link. Therefore the personalization machine 3 dialogues directly with the programmable electronic holder via contactless transmission.

In these embodiments, the size of the adapting element 1 is greater, at least in width and depth, than that of all programmable electronic holders 2 to be personalized and meets the size accepted by personalization machines 3. Moreover, the holder connector 102 is adapted to the type of programmable electronic holder 2 to be personalized. In this way, it is possible with a single personalization machine 3 to personalize all types of programmable electronic holders by simply charging the adapting element 1, which is of standard size suitable for the personalization machine 3, choosing adapting element 1 in relation to the shape and type of programmable electronic holder to be personalized.

Therefore, the programmable electronic holders to be personalized may be different in size, may use a contact or contactless communication protocol or both, may meet the protocol of ISO 7816 or ISO 14443 A and B chip cards or any other own communication protocol.

The adapting element according to the invention can be used on different types of personalization machines 3. It allows to provide for each personalization machine a standard mechanical interface irrespective of the type of programmable electronic holder 2 which is to be personalized. Each personalization machine can therefore hence all types of programmable electronic holders without undergoing any change in its structure.

Each personalization machine 3 comprises at least:
an unstacking system 300 to unstack the adapting elements 1 from an input hopper 30, and a stacking system 310 to stack the adapting elements 1 in an output hopper 31,
an insertion system 34 to insert the programmable electronic holders 2 in the adapting elements 1 at the start of the personalization machine 3, and a removal system 39 to remove the programmable electronic holders 2 from the adapting elements 1 at the end of the personalization machine 3,
a driving system 32 to drive the adapting elements 1 so as to bring them successively to each station of the personalization machine 3, and
a personalization device 33 comprising a communication system between a database supplying the personalization data and the programmable electronic holders 2 via the contact or contactless link between the personalization device 33 of personalization machine 3 and the communication means (202–204) of the programmable electronic holder 2, to enable personalization of the programmable electronic holders 2 by programming personalization data in the programmable memory of the programmable electronic holders.

Figure 3:
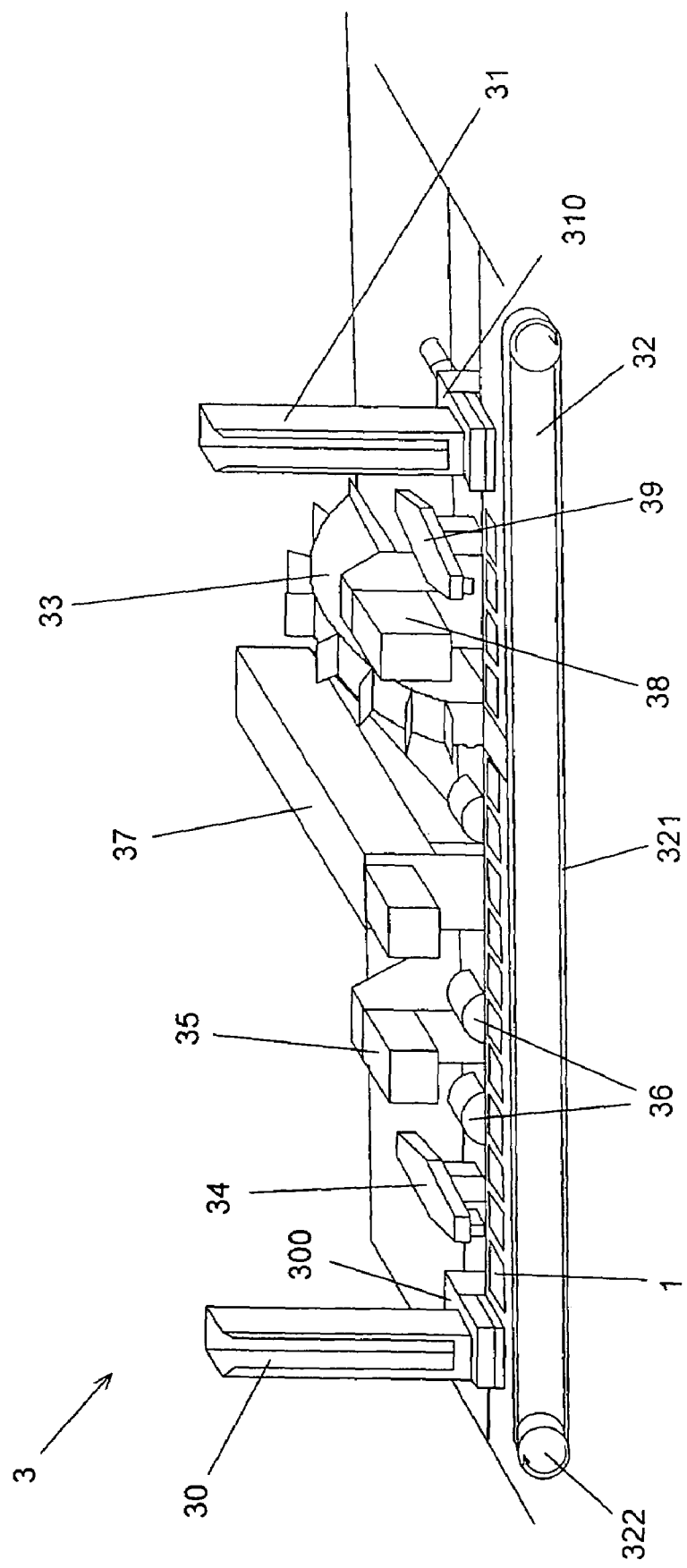
FIG. 3 shows a personalization machine according to an embodiment of the present invention.

In one embodiment, shown in FIG. 3, the adapting elements 1 are unstacked on the drive system 32 from input hopper 30 and travel along the personalization machine 3 as far as output hopper 31. Between the two hoppers (30,31) the adapting elements 1 successively pass through:
an insertion station 34 for inserting the programmable electronic holders 2 in the adapting elements 1,
the personalization device 33 for the programmable electronic holders 2, and
a removal station 39 to remove the programmable electronic holders 2 from the adapting elements 1, the programmable electronic holders then possibly being stacked in a storage hopper awaiting a further processing.

Other processing stations may be included between the insertion and removal stations for the programmable electronic holders into and from the adapting elements. These other stations may, for example, be:
an inspection station 35 to inspect for example the positioning of the programmable electronic holders 2 in the adapting elements 1, or the outer status of programmable electronic holders 2 such as printing on said holders,
a marking or engraving station 37 for programmable electronic holders 2,
an identification station 38 to identify the programmable electronic holders 2, for example a camera or bar code reader if the programmable electronic holders are provided with a bar code, so as to control the marking of the holders for example performed at marking station 37 previously cited.

After processing and removal of the programmable electronic holders 2, the adapting elements 1 are then stacked in output hopper 31 of the personalization machine 3.

In one variant of embodiment (not shown) the personalization machine comprises a transfer system allowing to transfer the adapting elements from the output hopper to the input hopper of the personalization machine, thereby enabling filling of the input hopper and emptying of the output hopper.

In another variant of embodiment, the input and output hoppers of the personalization machine may be merged.

It would be obvious for persons skilled in the art that the present invention enables embodiments in numerous other specific forms without departing from the field of application of the invention as claimed. Therefore the above embodiments are to be considered as illustrations but can be modified within the field defined by the scope of the enclosed claims, and the invention is not to be limited to the details given above.

The invention claimed is:

1. A plurality of identical adapting elements, for at least one programmable electronic holder to be personalized, having surface size larger than that of all programmable electronic holders to be personalized and having a geometry enabling it to be accepted by a personalization machine, wherein the adapting element having a housing of suitable shape and size to house and maintain at least one programmable electronic holder, so that a contact or contactless communication arrangement of the programmable electronic holder is respectively positioned opposite or close to a respective contact or contactless communication arrangement of the personalization machine, the elements being
in combination with a multipurpose personalization machine for programmable electronic holders, the personalization machine comprising at least;
an unstacking system to unstack adapting elements from an input hopper, and a stacking system to stack adapting elements in an output hopper, the input hopper and the output hopper possibly being separate or not,
an insertion system to insert programmable electronic holders in adapting elements at a start of the personalization machine, and a removal system to remove the programmable electronic holders from adapting elements at an end of the personalization machine, a driving system to drive the adapting elements provided with programmable electronic holders, to cause them to transit through the personalization machine, and a personalization device comprising a communication system between a database supplying the personalization data and the programmable electronic holders via contact or contactless link between the personalization device of the personalization machine and the communication means of the programmable electronic holder, to enable personalization of the programmable electronic holders by programming personalization data.

2. A plurality of identical adapting elements for adapting a specific category of programmable electronic holders to be personalized to a personalization machine, each adapting element being arranged to be transported respectively between an unstacking system for unstacking adapting elements and a personalization device, and between a personalization device and a stacking system to stack adapting elements, the adapting element having (a) a surface size larger than that of all programmable electronic holders to be personalized and (b) a geometry so that it can be accepted by a personalization machine, wherein the adapting element comprises a housing defining a cavity of suitable shape and size to house at least one programmable electronic holder having a determined form or type to be inserted in the adapting element during transportation between an unstacking system and a personalization device and to be removed from the adapting element during transportation between a personalization device and a stacking system, said housing being arranged for maintaining a programmable electronic holder inserted in said housing so that a contact or contactless communication arrangement of the programmable electronic holder is positioned opposite or close to a respective contact or contactless communication arrangement of the personalization device of a personalization machine to enable a communication link to be provided between the programmable electronic holder and the personalization machine, the plurality of identical adapting elements being in combination with a multipurpose personalization machine for programmable electronic holders, the personalization machine comprising:

(a) an unstacking system for stacking the adapting elements in an input hopper, (b) a stacking system for stacking adapting elements in an output hopper, the input hopper and the output hopper being separate from each other or not, (c) an insertion system for inserting the programmable electronic holders in adapting elements at an input of the personalization machine, and a removal system to remove the programmable electronic holders from adapting elements at an output of the personalization machine, (d) a driving system for driving the adapting elements provided with programmable electronic holders, to cause them to transit through the personalization machine, and (e) a personalization device comprising a communication system between a database for supplying the personalization data and the programmable electronic holders via a contact or contactless link between the personalization device of the personalization machine and the communication arrangement of the programmable electronic holder for enabling personalization of the programmable electronic holders by programming personalization data.

3. The combination of claim 2, wherein said housing includes a body deprived of any contact or contactless communication element.

4. The combination of claim 2, wherein the adapting element is an analogue adapting element and said body has a flat mechanical interface adapted for a personalization machine and stackable with other analogue adapting elements.

5. The combination of claim 2, wherein the adapting element is a single piece independent of said personalization machine, the arrangement of the housing for maintaining the programmable electronic holder inserted in the housing including a connector for connecting one side of a flat programmable electronic holder.

6. The combination of claim 5, wherein the flat programmable electronic holder is a smart card.

7. The combination of claim 2 in combination with another plurality of identical adapting elements, each of the adapting elements of the another plurality being arranged to be transported respectively between an unstacking system for unstacking adapting elements and a personalization device, and between a personalization device and a stacking system to stack adapting elements, each of the adapting elements of the another plurality having (a) a surface size larger than that of all programmable electronic holders to be personalized and (b) a geometry so that it can be accepted by a personalization machine, wherein the adapting element comprises a housing defining a cavity of suitable shape and size to house at least one programmable electronic holder having a determined form or type to be inserted in the adapting element during transportation between an unstacking system and a personalization device and to be removed from the adapting element during transportation between a personalization device and a stacking system, said housing being arranged for maintaining a programmable electronic holder inserted in said housing so that a contact or contactless communication arrangement of the programmable electronic holder is positioned opposite or close to a respective contact or contactless communication arrangement of the personalization device of a personalization machine to enable a communication link to be provided between the programmable electronic holder and the personalization machine the another plurality of identical adapting elements being arranged for providing an adaptation for one other single form or one other type of programmable electronic holders to be personalized.

* * * * *